United States Patent [19]

Anderson et al.

[11] 4,347,090
[45] Aug. 31, 1982

[54] PROCESS FOR FORMING LAMINATED PIPE

[75] Inventors: Edward P. Anderson, Mickleton, N.J.; Donald G. Curran, Norwood, Pa.

[73] Assignee: Bunnell Plastics, Inc., Mickelton, N.J.

[21] Appl. No.: 200,263

[22] Filed: Oct. 24, 1980

[51] Int. Cl.³ ............................................. B32B 31/26
[52] U.S. Cl. .................................... 156/149; 138/125; 156/156; 156/187; 428/36; 428/441; 428/442; 428/422
[58] Field of Search ...................... 156/149, 156, 187; 428/36, 422, 441, 442; 138/125

[56] References Cited

U.S. PATENT DOCUMENTS

| | | | |
|---|---|---|---|
| 1,798,798 | 3/1931 | Leguillon | 156/149 |
| 2,752,952 | 7/1956 | Dauphinais | 156/149 |
| 2,783,173 | 2/1957 | Walker et al. | 154/83 |
| 2,888,042 | 5/1959 | St. John et al. | 138/55 |
| 2,974,713 | 3/1961 | Hydrich | 156/149 |
| 3,414,448 | 12/1968 | Harpfer | 156/149 |
| 4,104,095 | 8/1978 | Shaw | 156/83 |
| 4,282,905 | 8/1981 | Dopkin | 428/36 |

Primary Examiner—Ellis P. Robinson
Attorney, Agent, or Firm—Howson and Howson

[57] ABSTRACT

A laminated tubular structure is obtained by a process in which a fabric sleeve is applied about a tube of thermoplastic polymer, following which plugs are inserted into the opposing ends of the liner. A liquid, such as water, is then introduced to the liner, and the liner is rotated about a horizontal axis while heat is applied to the exterior surface of the liner, causing the surface to become molten. The heat also causes vaporization of some of the liquid in the liner and the resulting vapor pressure causes the molten surface of the liner to expand radially into the interstices of the fabric sleeve. The inner surface of the liner remains solid and form-maintaining by reason of the liquid within the liner and heat absorbed on vaporization of liquid. Upon cooling there is obtained a good mechanical bond between the liner and sleeve. The liner-sleeve composite can be further reinforced by a surrounding layer of a thermosetting resin containing reinforcing fibers, the resin layer being bonded to the composite by means of the sleeve.

20 Claims, 5 Drawing Figures

PROCESS FOR FORMING LAMINATED PIPE

BACKGROUND OF THE INVENTION

In the chemical industries there is a great need for pipe capable of handling highly corrosive and/or abrasive liquids, slurries and gases, particularly at elevated temperatures. Pipe corrosion problems are also chronic in such fields as food handling and processing, electroplating, metal pickling and petroleum refining. The pipe produced by the process of this invention has utility in all of these fields.

Pipe commonly used today for handling corrosive or abrasive materials comprises a liner formed of a thermoplastic material which is substantially chemically inert to the material to be conducted through the pipe, surrounded by one or more layers of a reinforcing material, such as steel, and glass fibers impregnated with a thermosetting resin.

A particular problem encountered in the manufacture of such pipe is the bonding of the liner of thermoplastic material to the reinforcing layers which is particularly essential for vacuum service. More particularly, fluorinated polymers and polyolefins which are highly resistant to chemical attack, do not lend themselves to bonding to other materials, such as a supporting resin impregnated fiber sleeve, by means of ordinary adhesives. For this reason efforts have been directed to obtaining a physical or mechanical bond between the exterior surface of the thermoplastic liner and a reinforcing sleeve.

According to U.S. Pat. No. 4,104,095 granted Aug. 1, 1978 to William D. Shaw, such a mechanical bond between a thermoplastic liner and a surrounding sleeve formed of a woven glass fabric can be obtained by applying to a cylindrical liner of thermoplastic material a woven glass fiber tape, and externally applying heat to the outer surface of the liner through the sleeve. The heat causes the outer surface of the liner to melt and, by reason of the greater coefficient of thermal expansion of the liner, as compared to the glass fiber tape, the liner expands radially to a greater degree than the tape, whereby the molten exterior surface of the liner enters the interstices of the glass fabric. Upon cooling, there is obtained a mechanical bond between the liner and glass fabric tape. A further exterior reinforcing layer, as for example a layer of a fiber-reinforced thermosetting resin, can then be bonded directly to the first glass fiber tape. In this way the problem of direct bonding of a reinforcing layer to a thermoplastic liner by means of adhesives is avoided.

In the process of U.S. Pat. No. 4,104,095 the mechanical bonding of the liner to the reinforcing glass fiber tape is obtained without introduction of a gas under pressure to the liner during the heating step. Rather, expansion of the molten surface of the thermoplastic liner into the interstices of the reinforcing glass fiber tape is due entirely to the difference in the coefficients of thermal expansion of the liner and reinforcing tape.

The process of U.S. Pat. No. 4,104,095 has been found wanting in a number of respects. Composite pipe having a diameter greater than 6" cannot be made without some deformation or collapse of the liner. The process cannot be used successfully where the reinforcing layer comprises a knitted fabric, for such fabric, by reason of its structure readily expands radially along with the liner. In addition, composite pipe made by the method of U.S. Pat. No. 4,104,095 generally evidences a great deal of bow or warpage.

Another process which has been suggested for the manufacture of seamless laminated pipe comprises inserting in a cylindrical glass fabric sleeve a liner of a thermoplastic polymer, the external surface of which liner has applied thereto an adhesive which is a polymer similar to that of the liner, but has a higher melt index number than that of the liner per se. The resulting assembly is placed in a hollow cylinder and heated to cause the adhesive to soften. Gas pressure is applied within the liner to cause the liner to expand radially so that the adhesive enters the interstices of the glass fabric sleeve. Upon cooling the entire assembly while so expanded, there is obtained a unitary structure, the liner being mechanically bonded to the glass fabric sleeve in essentially the same manner as described in U.S. Pat. No. 4,104,095.

The last-described process also has a number of shortcomings. The expansion of the tubing by means of gas pressure is sufficient to produce residual stresses in the liner which may be relieved in service, resulting in separation of the liner from the surrounding reinforcing glass fabric sleeve. By reason thereof, the pipe loses its vacuum service capabilities. The heating and cooling steps of the process are carried out in a cylindrical chamber which is expensive to fabricate and, for practical handling reasons, must have a limited length, thereby restricting the length of pipe that can be made. Also, the process requires precise temperature control and involves the use of extended heating and cooling cycles.

SUMMARY OF THE INVENTION

In accordance with the present invention there is provided a novel process for the manufacture of laminated pipe of improved quality. Briefly, the process comprises applying a sleeve of fabric about a seamless tube of thermoplastic material, following which plugs are inserted into each end of the liner to seal the interior of the liner from the surrounding atmosphere. One or the other, or both, of the plugs may be provided with means for introducing a liquid into the interior of the liner, and pressure relief valve means to prevent the pressure of vaporized liquid within the liner from exceeding a given value upon heating the liner and sleeve to elevated temperatures.

A liquid which is chemically inert to the liner and has a boiling point substantially below the melting point of the thermoplastic polymer of which the liner is composed, is introduced to the interior of the liner. The quantity of liquid so introduced will depend upon a number of factors as described hereinafter.

The liner and surrounding sleeve are caused to rotate about their common axis. This can be accomplished by placing the liner and sleeve upon two spaced apart horizontally extending rollers which cause the liner and sleeve to rotate about their common axis. Heat is applied to an arcuate portion of the outer surface of the liner through the sleeve. The time of heating and the rates of application of heat and rotation of the liner and sleeve are such as to cause the exterior surface of the liner to become molten. In addition, by reason of the heat applied, volatilization of a portion of the liquid within the liner takes place to provide internal cooling due to the latent heat of vaporization, and the volatilized liquid creates a pressure therein which exceeds the pressure of the atmosphere external of the liner, whereby the liner expands radially outward to force the molten surface portion thereof into the interstices of the fabric sleeve. In addition, a substantial portion of the liquid within the liner does not volatilize and creates a temperature gradient across the wall of the liner to maintain the inner surface of the liner solid and self-supporting. The liquid also provides additional weight to produce nip pressure between the rolls and liner-sleeve composite.

The liner is then cooled to solidify the exterior surface thereof with the result that a permanent mechanical bond is formed between the outer surface of the liner and the sleeve.

The process of the present invention overcomes a number of the shortcomings of the prior known processes hereinabove described. More particularly, the process can be employed in the manufacture of laminated pipe of various sizes, pipe having a diameter as great as 18" having been successfully produced thereby. Such flexibility is due in substantial part to the liquid within the liner, a large portion of which remains liquid during the heating step and thereby maintains the inner surface of the liner solid, preventing liner collapse. The process avoids the need for applying to the exterior surface of the liner an adhesive film, such as a thermoplastic polymer of the same type as that of which the liner is formed, but having a higher melt index number. The apparatus required for carrying out the process is of simple and relatively inexpensive construction, amounting to nothing more than a pair of drive rolls with appropriate driving mechanism, a pair of liner plugs and a line heater. The process is relatively simple to control for the liquid within the liner prevents overheating which can result in liner collapse. The moderate vapor pressure within the liner not only aids in preventing liner collapse, but also assists in eliminating warpage. By wrapping the sleeve with a further reinforcing layer which resists expansion on heating, a laminated pipe in which the sleeve comprises an expansible knitted fabric, can be manufactured.

Other advantages of the invention will become apparent from the following detailed discussion, drawings and appended claims.

DETAILED DESCRIPTION OF THE INVENTION

Figure 1:
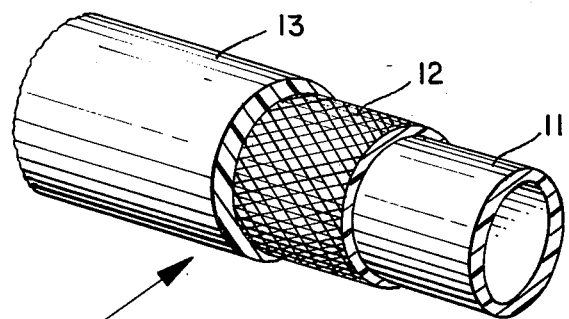
FIG. 1 is a sectional view showing the arrangement of the several laminae of the laminated pipe produced according to this invention in exploded relation.

FIG. 1 shows a laminated pipe 10 made according to this invention, partly broken away, and comprises a liner 11 of thermoplastic material surrounded by a sleeve 12 formed of a glass fabric which may be woven or knitted. Surrounding the sleeve 12 is a reinforcing layer which may comprise a thermosetting resin-impregnated glass cloth.

Figure 2:
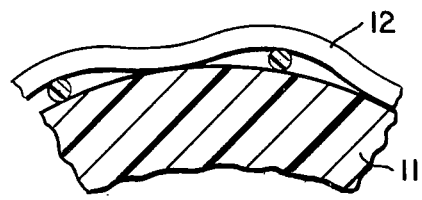
FIG. 2 is a greatly enlarged fragmentary cross section illustrating the liner and reinforcing glass fabric sleeve of FIG. 1 prior to carrying out the heating and cooling steps of the process of the invention.
Figure 3:
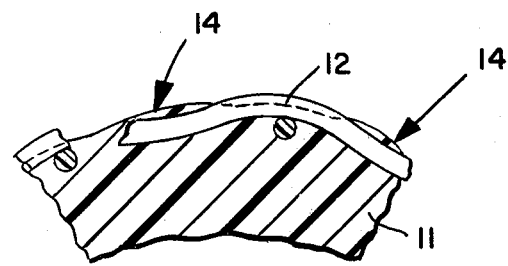
FIG. 3 is a greatly enlarged fragmentary cross section illustrating the liner and reinforcing glass fabric sleeve of FIG. 1 subsequent to completion of the heating and cooling steps of the process and illustrates the nature of the mechanical bond between the exterior surface of the liner and reinforcing glass sleeve.

Referring particularly to FIGS. 2 and 3, in the former there is illustrated by way of a greatly enlarged fragmentary cross section the liner 11 about the external surface of which has been applied the sleeve 12 of glass fabric. As can be seen the sleeve embraces the liner in close-fitting relationship. By reason of the heating and cooling step of the process of the invention described in greater detail hereinafter, the exterior surface of the liner, which becomes molten during heating, expands into the interstices of the sleeve 12 and forms protuberances 14 which solidify upon cooling of the liner and sleeve. The protuberances 14 form a substantially permanent mechanical bond between the liner 11 and sleeve 12.

Figure 4:
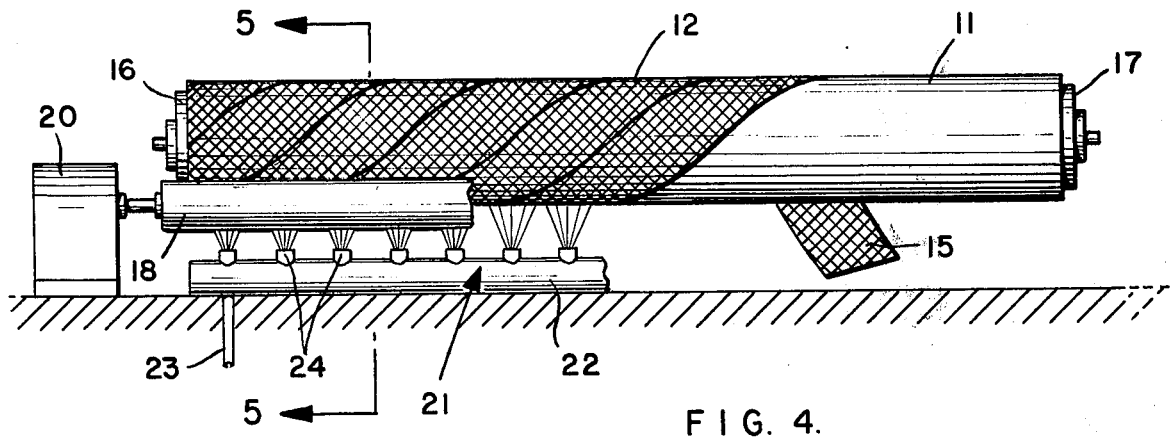
FIG. 4 is a side elevation of one form of apparatus for carrying out the process of the invention with parts broken away for purposes of illustration.
Figure 5:
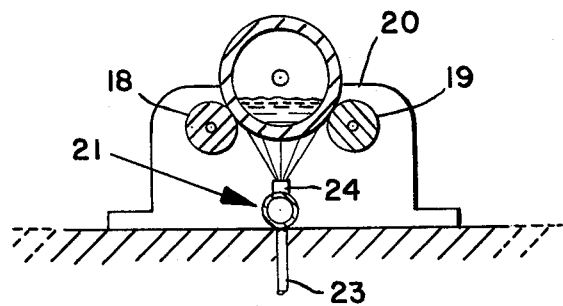
FIG. 5 is a cross section of the apparatus of FIG. 4 taken along the line 5—5.

As shown in FIGS. 4 and 5, the liner 11 is encased in a sleeve 12 which is provided by winding about the liner a tape of a woven glass fabric 15. In the opposite ends of the liner 11 are plugs 16 and 17, respectively which seal the interior of the liner from the surrounding atmosphere. One or both of the plugs may be provided with means (not shown) for introducing a liquid, such as water, into the interior of the liner. Also, either or both of the plugs 16, 17 may be fitted with pressure relief valve means, not shown, for regulating the pressure within the liner during the heating step of the process, which step causes a portion of the liquid within the liner to vaporize and create therein a superatmospheric pressure. The plugs 16, 17 can also be provided with means for introducing air under low pressure into the liner to facilitate handling prior to the bonding step.

The liner 11 and surrounding sleeve 12 are supported in a substantially horizontal position by a pair of spaced rolls 18 and 19 which are driven about their respective substantially parallel axes by drive means 20. Rotation of rolls 18 and 19 causes the liner and sleeve to rotate about their common axis.

Beneath the liner and sleeve and lying between the rolls 18 and 19 is a burner system 21 which includes a pipe 22 supplied with a gaseous fuel, such as natural gas, liquid propane gas, or the like, by means of a pipe 23. The pipe 22 is fitted with a plurality of burners 24 located at substantially equal intervals along the length of the pipe. The distance between burners is such that the application of heat to the liner through the sleeve is substantially uniform throughout the length of the liner, the heat being applied to an arcuate portion of the liner and sleeve which lies between the rollers. With small diameter liners, by reason of the close proximity of the parallel drive rolls required to support the liner, it may be necessary to apply heat to the side of the liner at a point above one of the rolls. Also, with large diameter liners it may be desirable to apply the heat to the side of the liner above the liquid level within the liner. In such an arrangement the liner preferably is rotated through the heat to the closest nip area above the liquid level. In this way the liner surface is melted rapidly without heat loss to the liquid. However, the liquid maintains the interior surface in a solid self-supporting condition. In place of a hot gas, the heating may be accomplished by means of radiant energy or by heating one or both of the drive rolls.

The liner 11 may be formed of any thermoplastic material which has those properties, particularly inertness to chemical attack, required by the particular system for which the pipe was designed. Examples of such thermoplastic polymers are the polyolefins, such as polyethylene and polypropylene, and fluorinated polymers, the latter being particularly preferred in many systems because of their relative chemical inertness at elevated temperatures. Typical of the fluorinated polymers are polyvinylidene fluoride sold under the trademark Kynar and melt-fabricatable perhalopolyfluoroethylene copolymers, which include chlorotrifluoroethylene and tetrafluoroethylene, copolymerized with fluoroolefins such as hexafluoropropylene (FEP), or with perfluoralkyl vinyl ether monomers such as perfluoro-propyl-or ethyl-vinyl ether, or with non-fluorinated monomers such as alkylenes, e.g. ethylene, including the tetrafluoroethylene/ethylene binary polymers and terpolymers, copolymers of tetrafluoroethylene and hexafluoropropylene (FEP) sold under the trademark Teflon, being especially useful.

FEP copolymers, such as those containing 5-20% by weight of hexafluoropropylene and 80-95% tetrafluoroethylene having a melt index number of from about 0.8-12 are particularly useful for forming the liners. A particularly preferred liner material comprises a copolymer of 83-85% tetrafluoroethylene and 15-17% hexafluoropropylene having a melt index number of about 0.9-1.9. Melt index numbers as used herein are determined according to ASTM D-1238, using a 5000 gram load at 272° C. for 10 minutes.

Although ordinarily not essential, if desired a bonding aid composed of the same type of polymer as that of the liner, but which has a melt index number higher than that of the liner, may be applied to the exterior surface of the liner. Because of its higher melt index number, such bonding aid has greater flowability at elevated temperatures employed in laminating the liner to the surrounding fabric sleeve, enhancing its penetration of the fabric interstices. The bonding aid may be applied to the liner in the form of a thin film or tape which is wrapped about the liner, the film having a thickness of about 1 mil minimum and about 10 mils maximum, films 2-5 mils in thickness being preferred. Although such a bonding aid is preferably applied to the liner as a thin film, it can also be a freshly formed extrudate applied prior to being completely cooled, or a dispersion or paste applied to liner or contact surface of fabric in one or more coats until a minimum thickness of 1 mil is obtained.

After selection of a suitable length of liner of the desired diameter, which length may be many feet, plugs are inserted into the opposing ends thereof to seal the interior of the liner from the surrounding atmosphere. One or both of the plugs, which can be of any suitable design, may be provided with means for introducing a liquid into the interior of the liner, the function of which is described in greater detail hereinbelow. At least one of the plugs should be provided with pressure relief valve means in order to prevent the pressure of vaporized liquid within the liner from exceeding a predetermined value when the liner and sleeve are heated to elevated temperatures. Relief valves suitable for such purpose are well known to those skilled in the art and thus need not be described in greater detail in this specification.

As noted above, a liquid, which has a boiling point substantially below the melting point of the liner, is introduced to the interior of the liner. The function of the liquid is several fold. Upon heating the liner to cause the exterior surface thereof to become molten, a portion of the liquid is vaporized, whereby the vapor pressure within the liner exceeds the atmospheric pressure exterior of the liner. This pressure differential aids in causing the liner to expand radially and assists in preventing the liner from collapse at elevated temperatures. Since the coefficient of expansion of the liner will ordinarily be considerably greater than that of the fabric which surrounds it, the liner expands radially upon heating, and such expansion is enhanced by the gas or vapor pressure within the liner, whereby the molten exterior surface of the liner is caused to flow into the interstices of the fabric sleeve. However, not all of the liquid is vaporized, and that which remains liquid, together with heat removal caused by vaporization of liquid, maintains the interior surface of the liner solid and self-supporting and, with the assistance of the vapor pressure of volatilized liquid, prevents the liner from collapsing during the heating step. These advantageous results are obtained even when making large diameter, e.g. 18" diameter laminated pipe, according to the present invention.

As noted, the liquid should have a boiling point substantially below the melting point of the thermoplastic material of which the liner is formed. Ordinarily a temperature difference of at least about 50° F. is satisfactory, since such a difference permits volatilization of a sufficient quantity of the liquid during the heating step to provide the desired superatmospheric pressure within the liner, which pressure preferably is from about 0.1 to about 10 psig, higher pressures generally being used with smaller diameter liners.

Liquids suitable for introduction to the liner should be chemically inert with respect to the liner material. Examples of suitable liquids are water, or other non-flammable low boiling liquids, water being the preferred liquid by reason of its availability, low cost, and safety.

The amount of liquid introduced to the liner will depend on such factors as the particular liquid used, the liner material, the diameter of the liner, the wall thickness thereof, and the magnitude of the heat source. As a general rule, the quantity of liquid present should be sufficient to provide the necessary cooling and nip pressure to obtain the desired bonding of the liner to the sleeve. In most instances, the surface of the liquid within the liner will be above the plane which intersects the lines of contact between the liner and the support rolls, greater depth of liquid generally being used with smaller diameter liners in order to obtain the desired nip pressures.

Applied about the liner, which preferably is seamless and obtained by melt extrusion, is a fabric sleeve. The fabric can be woven or knit from any fiber which does not undergo degradation at the elevated temperatures used in laminating the liner to the sleeve. Suitable fibers include natural or synthetic fibers, such as glass fibers, metal fibers, graphite fibers, ceramic fibers, asbestos fibers, aromatic aramid fibers, and the like. Because of their desirable physical properties, such as chemical inertness, a substantially lower coefficient of expansion than the thermoplastic polymers, strength, etc., glass fibers are preferred, which fibers can be of the continuous filament type or yarn formed of chopped fibers.

In the case of woven fabrics, which may be of any suitable weave, such as a plain weave (see FIGS. 2 and 3), they preferably are in the form of a tape, such as tape 15 (FIG. 4), which is wrapped tightly about the liner with substantially no overlapping of adjacent convolutions. The advantage of using a woven fabric, as compared to a knitted fabric, is that the latter, by reason of its structure, has considerable extensibility and, therefore, can expand with the liner upon heating. In order to prevent such expansion when using a knitted fabric, which may be in the form of a tubular sleeve which is slipped over the liner, it is generally necessary to surround the fabric sleeve with another reinforcing layer. Suitable for such purpose is a metal tape which is wrapped around the assembly comprising liner and sleeve prior to heating the assembly to elevated temperatures. A woven glass fiber tape can also be used in place of the metal tape with effective results. In some instances, the nip pressures per se, may be sufficient to cause the molten liner surface to flow into the sleeve thereby obviating the need for the reinforcing or restraining layer.

The liner with the fabric sleeve applied thereto is then mounted for rotation, preferably about a horizontal axis, as by means of spaced parallel rolls 18 and 19. Heat, usually in the form of a hot gas, such as the products of combustion of natural gas, is applied to an arcuate portion of the liner through the fabric sleeve. The time of application of heat, and the rate of application thereof and of rotation of and liner and sleeve is such as to cause the exterior surface of the liner to become molten and to cause volatilization of that portion of the liquid within the liner which provides the desired superatmospheric pressure. It is readily apparent that such factors as the diameter of the liner, thickness of the liner wall, nature of the fabric sleeve, and type of liquid within the liner, must be taken into consideration in determining heating conditions. For FEP liners about 6" in diameter and having a wall thickness of 100 mils, employing a sleeve formed of a glass fabric tape of plain weave and water as the liquid, heating times not exceeding about 4-5 minutes, while rotating the liner and sleeve at about 4 rpm, using the burner arrangement illustrated in FIG. 4, followed by cooling produces the desired mechanical bond. On the other hand, 18" diameter liners of FEP having a wall thickness of 100 mils, having a similar sleeve, should be heated on the order of about 6-7 minutes, while being rotated at about 2 rpm. Excessive heating, however, is to be avoided, for the degree of expansion should not be such that the protuberances 14 of molten polymer extend entirely through the fabric, for if they do, after the exterior surface of the fabric is cooled, adhesive bonding of any additional reinforcing layer to the sleeve becomes most difficult.

It will be understood that anyone skilled in the art, after carrying out a few test runs, will have no difficulty in establishing optimum heating conditions for any size liner formed of a particular thermoplastic polymer and to which has been applied a sleeve of a given weave or knit.

A particular advantage of using the apparatus illustrated in FIG. 4 is that the rolls 18 and 19 apply nip pressure along the entire length of the assembly as the assembly is rotated by reason of the weight of the assembly including the liquid within the liner. Such nip pressure assists in obtaining a strong mechanical bond between the liner and sleeve.

In that embodiment of the invention in which heat is applied to the liner by heated drive rolls, the rotation of the liner by the rolls should be sufficiently slow to permit good heat transfer through the sleeve to the liner. The speed of rotation will depend upon such factors as roll temperature, size of nip area between drive rolls and liner-sleeve assembly, it being recognized that better heat transfer can be accomplished with large diameter liners rotated by relatively large diameter drive rolls.

Following the heating step, the assembly comprising liner and sleeve is allowed to cool. Such cooling can be accomplished by merely rotating the liner and sleeve in the absence of applied heat, cooling being effected by continued volatilization of liquid within the liner and ambient temperature conditions. Such cooling causes the surface of the liner to solidify whereby the protuberances 14 become mechanically locked to the fibers of the sleeve. The cooling should be carried out in a substantially uniform manner along the length of the assembly in order to avoid warpage.

After cooling, the plugs 16 and 17 are removed, and the liquid drained from the interior of the liner. A reinforcing layer 13, which may comprise a woven glass fabric of continuous filaments impregnated with a suitable resin, such as a thermosetting resin, e.g. polyester resin, may be applied to the assembly. Inasmuch as the protuberances 14 do not extend entirely through the fabric 11, there exists a fabric surface which may be adhesively bonded directly to the further reinforcing layer 13. Thus, a strong integral pipe assembly is obtained even with a liner formed of a thermoplastic material which does not readily adhere to ordinary adhesives.

The following examples illustrate various embodiments of the invention.

EXAMPLE I

A piece of seamless extruded FEP tubing (16% by weight of hexafluoropropylene and 84% of tetrafluoroethylene) having an inside diameter of 14 inches and a wall thickness of 100 mils was cut to a length of 6½ feet. A 1-1.5 mil thick FEP film was applied about the tubing over which was applied a knitted sleeve of glass fibers. Over the tubing bearing the knitted sleeve was applied a spiral wrapping of stainless steel screen (20 mesh, 0.009 wire). Approximately three gallons of water were introduced to the liner, after each end of the tubing was sealed off from the surrounding atmosphere by a plug, each plug being mounted on a rotatable shaft which extended through the liner along its axis. One of the plugs was fitted with pressure relief valve means for controlling the steam pressure within the liner so as not to exceed about 2 psig during the heating step.

The resulting assembly was mounted for rotation about a horizontal axis, and heat was applied to an arcuate portion of the assembly throughout its entire length as it was rotated by means of a gas burner located 3 inches below and offset 4 inches from the center of the tubing. The assembly was rotated for one revolution at 10 rpm, and then for three revolutions at 2 rpm. The internal pressure rose to 2 psig and opened the relief valve. The pressure remained steady throughout the heating step.

Following heating, the assembly was allowed to cool. After cooling, the wire screen was removed, and the resulting liner-sleeve composite was inspected and good mechanical bonding between the liner and sleeve was noted.

EXAMPLE II

The procedure generally as described in Example I was repeated using a piece of seamless extruded FEP tubing having an inside diameter of 18 inches, and good bonding between the liner and sleeve was achieved.

EXAMPLE III

The procedure generally as described in Example I was repeated using a piece of seamless extruded FEP tubing having an inside diameter of 3 inches without the use of the 1–1.5 mil FEP film described in Example I. Good bonding between the liner and sleeve was achieved.

What is claimed is:

1. A process for forming a laminated tubular structure which comprises:
   (a) applying a sleeve of a fabric about a tube of thermoplastic polymer,
   (b) inserting a plug into each end of said liner to seal the interior of said liner from the surrounding atmosphere, at least one of said plugs having pressure relief valve means to prevent the pressure of vaporized liquid within said liner from exceeding a given value upon heating said liner and sleeve to elevated temperatures,
   (c) introducing to said liner a liquid which is chemically inert with respect to said liner and has a boiling point substantially below the melting point of said thermoplastic polymer,
   (d) applying heat to an arcuate portion of the outer surface of said liner through said sleeve while rotating said liner and sleeve, the time of heating and the rates of application of heat and rotation of said liner and sleeve being such as to cause the exterior surface of said liner to melt and volatilization of a portion of said liquid to create a pressure within said liner which exceeds the pressure of the atmosphere external of said liner to cause said liner to expand radially whereby the molten exterior surface thereof enters into the interstices of said fabric, said liquid within said liner providing a temperature gradient across the wall of said liner whereby the inner surface thereof remains solid and self-supporting, and
   (e) cooling said liner to solidify the exterior surface thereof to produce a permanent mechanical bond between said sleeve and the outer surface of said liner.

2. The process according to claim 1 in which the fabric sleeve is made of glass fibers.

3. The process according to claim 2 in which said sleeve is formed by wrapping a layer of woven glass fiber tape about said liner.

4. The process according to claim 2 in which said sleeve comprises a tubular knitted fabric over which is applied a reinforcing sleeve which prevents said tubular knitted fabric from expanding to the same degree as said liner upon heating said liner.

5. The process according to claim 1 in which said thermoplastic polymer is a fluorinated polymer.

6. The process according to claim 5 in which said fluorinated polymer is a tetrafluoroethylene/hexafluoropropylene copolymer.

7. The process according to claim 1 in which said thermoplastic polymer is a polyolefin.

8. The process according to claim 7 in which said polyolefin is selected from the group consisting of polyethylene and polypropylene.

9. The process according to claim 1 in which said liquid is water.

10. The process according to claim 1 in which the pressure within said liner during said heating step is from about 0.1 to about 10 psig.

11. The process according to claim 1 in which said liner is rotated about its axis by a pair of spaced rolls which extend substantially the entire length of and support said liner and sleeve, said rolls rotating about axes substantially parallel with the axis of said liner and sleeve.

12. The process according to claim 11 in which said rolls are heated to a temperature sufficient to render the exterior surface of said liner in a molten condition.

13. The process according to claim 11 in which said heat is provided by means of a hot gas which is caused to impinge upon an arcuate portion of said liner above said spaced rolls and the surface of the liquid in said liner.

14. The process according to claim 1 in which said liner is heated by means of radiant energy.

15. A process for forming a corrosion-resistant laminated tubular structure which comprises:
   (a) applying a sleeve of glass fabric about a seamless tube of thermoplastic fluorinated polymer,
   (b) inserting a plug into each end of said liner to seal the interior of said liner from the surrounding atmosphere, at least one of said plugs having pressure relief valve means to prevent the pressure of vaporized liquid within said liner from exceeding a predetermined value upon heating said liner and sleeve to elevated temperatures,
   (c) introducing water to said liner,
   (d) rotating said liner and sleeve about a substantially horizontal axis, and applying heat to an arcuate portion of the outer surface of said liner through said sleeve, the time of heating and the rates of application of heat and rotation of said liner and sleeve being such as to cause the exterior surface of said liner to melt the volatilization of a portion of said water to create a pressure of from about 0.1 to about 10 psig within said liner, to cause said liner to expand radially whereby the molten exterior surface thereof enters into the interstices of said fabric, said water within said liner providing a temperature gradient across the wall of said liner whereby the inner surface thereof remains solid and self-supporting, and
   (e) cooling said liner to solidify the exterior surface thereof to produce a permanent mechanical bond between said sleeve and the outer surface of said liner.

16. The process according to claim 15 in which said fluorinated polymer is a tetrafluoroethylene/hexafluoropropylene copolymer.

17. The process according to claim 15 in which said liner and sleeve are supported and rotated by a pair of spaced rolls which extend substantially the entire length of said liner and sleeve, said rolls having axes of rotation substantially parallel to the axis of said liner and sleeve.

18. The process according to claim 17 in which said rolls are heated to a temperature sufficient to render the exterior surface of said liner in a molten condition.

19. The process according to claim 17 in which said heat is provided by means of a hot gas which is caused to impinge upon an arcuate portion of said liner above said said spaced rolls and the surface of the liquid in said liner.

20. The process according to claim 15 in which said liner is heated by means of radiant energy.

* * * * *

Disclaimer 4,347,090.—*Edward P. Anderson*, Mickleton, N.J., and *Donald G. Curran*, Norwood, Pa. PROCESS FOR FORMING LAMINATED PIPE. Patent dated Aug. 31, 1982. Disclaimer filed July 18, 1986, by the assignee, *Bunnell Plastics, Inc.*

Hereby enters this disclaimer to the remaining term of said patent.
[*Official Gazette October 7, 1986.*]